United States Patent
Dressler et al.

(10) Patent No.: US 12,265,973 B2
(45) Date of Patent: **\*Apr. 1, 2025**

(54) AUTOMATED CONSENT MANAGEMENT SYSTEMS AND METHODS FOR USING SAME

(71) Applicant: Rhinogram Inc., Chattanooga, TN (US)

(72) Inventors: Keith Dressler, Ooltewah, TN (US); Stanley Dressler, Chattanooga, TN (US); Shannon Hastings, London, OH (US); Kathy Ford, Chattanooga, TN (US)

(73) Assignee: Rhinogram Inc., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,026

(22) Filed: Jan. 19, 2023

(65) Prior Publication Data

US 2023/0169519 A1 Jun. 1, 2023

Related U.S. Application Data

(63) Continuation of application No. 17/133,454, filed on Dec. 23, 2020, now Pat. No. 11,587,098.

(51) Int. Cl.
*G06Q 30/00* (2023.01)
*G06F 21/62* (2013.01)
(Continued)

(52) U.S. Cl.
CPC ....... *G06Q 30/018* (2013.01); *G06F 21/6245* (2013.01); *G06Q 30/0201* (2013.01); *G06Q 30/0281* (2013.01)

(58) Field of Classification Search
CPC ............. G06Q 30/018; G06Q 30/0201; G06Q 30/0281; G06F 21/6245
(Continued)

(56) References Cited

U.S. PATENT DOCUMENTS 8,843,997 B1  9/2014 Hare
10,417,725 B2  9/2019 Whitfield et al.
(Continued)

OTHER PUBLICATIONS

NORCAL Group Risk Management, "Consent for Treatment of an Adolescent: Third-Party Consent", Jun. 25, 2020, retrieved from https://www.norcal-group.com/library/consent-for-treatment-of-an-adolescent-third-party-consent (Year: 2020).*

(Continued)

*Primary Examiner* — Sangeeta Bahl
*Assistant Examiner* — Joshua D Schneider
(74) *Attorney, Agent, or Firm* — Miller & Martin PLLC

(57) ABSTRACT

The disclosed embodiments can be used to automate the acquisition and management of user consents for one or more campaigns, thus reducing the possibility of unintended violations of consent requirements as compared with existing systems. In accordance with the disclosed embodiments, each user consent may be associated with at least three different values. The consent management system may be configured to filter consent values for various users and send user-consent requests to certain users based on their filtered user-consent values. In some disclosed embodiments, a user may provide consent to allow communications of the user's information to certain "connected parties." The connected parties, moreover, may need to separately provide user consent(s) as necessary to effectuate communications for a campaign in compliance with one or more laws, rules, or regulations.

23 Claims, 5 Drawing Sheets

(51) Int. Cl.
*G06Q 30/018* (2023.01)
*G06Q 30/02* (2023.01)
*G06Q 30/0201* (2023.01)

(58) Field of Classification Search
USPC .......................................................... 705/317
See application file for complete search history.

(56) References Cited

U.S. PATENT DOCUMENTS

| | | |
|---|---|---|
| 10,505,737 B1 | 12/2019 | Xu et al. |
| 10,623,567 B1 | 4/2020 | Perdue et al. |
| 10,754,932 B2 | 8/2020 | Wiederspohn et al. |
| 10,861,116 B1 | 12/2020 | Onstad et al. |
| 2005/0060417 A1 | 3/2005 | Rose |
| 2015/0050637 A1 | 2/2015 | James-Hatter et al. |
| 2015/0234796 A1 | 8/2015 | Williams et al. |
| 2019/0005210 A1 | 1/2019 | Wiederspohn et al. |
| 2019/0372770 A1 | 12/2019 | Xu et al. |
| 2019/0392171 A1 | 12/2019 | Barday et al. |
| 2020/0034553 A1* | 1/2020 | Kenyon ................ H04L 9/3239 |
| 2020/0168115 A1 | 5/2020 | Bell |
| 2020/0175554 A1 | 6/2020 | Vukich et al. |
| 2020/0272764 A1 | 8/2020 | Brannon et al. |

OTHER PUBLICATIONS

Rashmi Ashish Kadam, "Informed consent process: A step further towards making it meaningful!", Jul.-Sep. 2017, Perspectives in Clinical Research; vol. 8(3); pp. 107-112. (Year: 2017).

University of California San Francisco, "Obtaining and Documenting Informed Consent", Oct. 10, 2018, Published on UCSF Institutional Review Board (http://irb.ucsf.edu), retrieved from https://web.archive.org/web/20190429095449/https://irb.ucsf.edu/obtaining-and-documenting-informed-consent, Jul. 2018). (Year: 2018).

M. Zawadzinski and M. Wlosik, "What Is a Consent Management Platform (CMP) and How Does it Work?", dated Nov. 10, 2020, available at https://clearcode.cc/blog/consent-management-platform.

* cited by examiner

AUTOMATED CONSENT MANAGEMENT SYSTEMS AND METHODS FOR USING SAME

RELATED APPLICATIONS

The present application is a continuation of and claims a benefit of priority to U.S. application Ser. No. 17/133,454, filed on Dec. 23, 2020, now issued as U.S. Pat. No. 11,587,098, which is hereby incorporated by reference in its entirety as though fully set forth herein.

FIELD OF THE INVENTION

The present invention generally relates to consent management, and more particularly, to systems and methods for automating acquisition and management of user consents for one or more campaigns that comply with laws, rules, and/or regulations requiring such consents.

BACKGROUND OF THE INVENTION

In 1991, Congress passed the Telephone Consumer Protection Act (TCPA) to restrict unsolicited telemarketing phone calls to consumers. The TCPA protects consumers from receiving unwanted "robocalls" by placing restrictions on when and how such automated calls may be made and allowing consumers to opt out from receiving such calls. In accordance with the TCPA, the Federal Trade Commission (FTC) established a national "do not call" registry to protect consumers who do not wish to be contacted. Short Message Service (SMS) text messages sent to a consumer's cellular phone are considered "calls" for purposes of the TCPA.

According to the TCPA, and related Federal Communications Commission (FCC) rules, a consumer must provide its prior express consent before a telemarketer or other entity can make unsolicited calls or text messages to the consumer in a manner that would otherwise violate the TCPA's restrictions. For some communications, such as containing unsolicited advertisements, the consumer's prior express consent must be in writing. The TCPA's regulations generally mean that, as a practical matter, organizations must receive express written consent from individuals prior to sending any text messages to them.

In 1996, President Clinton signed the Health Insurance Portability and Accountability Act (HIPAA) into law. HIPAA protects the security and privacy of a patient's health information when it is in the possession of a third party, such as a doctor or other health care provider. For example, HIPAA requires a patient's written authorization before his or her protected health information (PHI) may be used or disclosed for marketing purposes. HIPAA security and privacy protections also cover electronic protected health information (ePHI) that is created, stored, transmitted, or received in any electronic format, including for example, via text messages.

In view of the foregoing, when a health care provider wants to exchange text messages with a patient, the health care provider first must obtain the patient's consent to send text messages as required by the TCPA. The health care provider also must give the patient an option to subsequently opt-out of text-message communications and, if they choose to opt out, the provider cannot send them any more text messages. Appointment reminders are exempt from opt-in consent, but not opt-out.

In addition to receiving the patient's TCPA consent to receive text messages, the health care provider also needs to obtain a separate prior written consent from the patient, as required by HIPAA, to begin exchanging ePHI with the patient using text messages. Further still, the health care provider may need separate additional consents from the patient for communicating payment, billing, survey, advertising, marketing, etc. information via text messages. In some cases, user consents also may be required to comply with the European Union's General Data Protection Regulation (GDPR) data protection requirements.

In this example, the health care provider desiring to communicate with its patients using text messages may need to acquire and manage a large number of user consents, e.g., separate types of consents (e.g., TCPA, HIPAA, etc.) per patient for many different patients. If the health care provider further wishes to create multiple "campaigns" in which it sends text messages and/or other types of messages (such as email) in each campaign for a common purpose, such as a first campaign to distribute patient invoices and a second campaign to confirm patient appointment times, the health care provider may need to manage an even greater number of user consents.

Consent management therefore can be a very complicated and burdensome process, typically managed manually through data entry. For example, each user consent is conventionally entered manually as a binary value (e.g., "yes" or "no" consent). Frequent changes and updates to the various user consents, however, can quickly become an unwieldy process that is prone to error. The opportunities for data-entry error further increase with the number of concurrent campaigns and participating users. In this context, a "user" is any person or group of people that must provide its consent to another entity before that other entity may create, send, receive, and/or store information of the user in compliance with one or more statutes, rules, policies, and/or regulations (regardless how defined or by whom). The user consent may be required based on governmental laws, rules, or regulations, but need not be. For example, one or more user consents may be required to comply with a company's policies or with certain contractual terms or conditions. As used herein, a "user consent" is an indication of a user's permission or authorization to allow another entity to perform an associated action.

Failures to obtain the required user consents under the TCPA and HIPAA can result in severe financial penalties. For example, TCPA violations are enforced by the FCC, which may levy up to more than $18,000 per violation. Consent and opt-out management violations are common reasons for TCPA fines. The Department of Health and Human Service's Office for Civil Rights similarly may impose tens of thousands of dollars in financial penalties for HIPAA violations. It is therefore important for health care providers, as well as other types of businesses, to comply with all relevant user-consent requirements set forth in the laws and regulations of the TCPA, HIPAA, FCC, FTC, GDPR, and more.

There is a current need for a more efficient way for an organization, such as a health care provider, business, governmental agency, or other entity, to manage large numbers of user consents, subject to compliance with various statutes, rules, and regulations, for use in one or more campaigns.

SUMMARY OF THE INVENTION

The present invention overcomes the disadvantages of the prior art by providing improved systems and methods for managing user consents. Unlike conventional systems, the disclosed embodiments can be used to automate the acquisition and management of user consents for one or more campaigns, thus reducing the possibility of unintended violations of consent requirements in statutes, rules, and regulations as compared with existing systems.

In accordance with the disclosed embodiments, a user consent may be associated with one of at least three possible values comprising: a first value indicating that the user has not yet responded with a grant or denial of consent; a second value indicating that the user has granted consent; and a third value indicating that the user has denied consent. In some embodiments, the third value also may indicate that the user has revoked a previously-granted consent. The automated consent management system may be configured to filter those user consents that are assigned to the first value and send requests for user consents to the users associated with the filtered user consents. In some embodiments, the user consent values may be filtered and their appropriate users contacted periodically, at predetermined times, or asynchronously, such as at the start of a new campaign or upon occurrence of one or more predetermined events.

For example, a health care provider may need to obtain a patient's consent pursuant to the TCPA before it can communicate with the patient using text messages. The health care provider may associate a TCPA consent value with the patient, where the patient's TCPA consent value is initially assigned a first (default) value indicating that the patient has not granted or denied consent for communicating via text messages. If the patient is associated with this first TCPA consent value, then the health care provider may send the patient a request for consent to exchange text messages. If the patient responds affirmatively, then the health care provider may change the patient's associated TCPA consent value to a second value indicating that consent has been granted; if the patient denies the requested consent, then the patient's TCPA consent value may be assigned a third value indicating that the patient may not be contacted using text messages. If, however, the patient in this example fails to respond, then the health care provider may keep the patient's TCPA consent value equal to the first value.

While the example above refers to a health care provider seeking a patient's TCPA consent, the present invention is not limited to any particular types of organizations, consents, or users. That is, the consent management systems and methods of the present invention advantageously may be used by any entities, whether health care providers, businesses, enterprises, governmental agencies, non-profits, or any other entities that manage consents for one or more users.

In some embodiments of the invention, the consent management systems and methods may manage multiple different types of consents for one or more users. Referring again to the example above, a patient may be associated with separate TCPA and HIPAA consent values and/or possibly other consent values, for example, for communicating billing, payment, ePHI, marketing, etc. information to the patient. In the disclosed embodiments where a single user is associated with multiple different types of consents, each consent value may be assigned a respective one of the above-described first, second, or third consent values.

Further to the disclosed embodiments, the consent management systems and methods may be used to implement one or more campaigns. Each campaign may be configured to communicate different types of information to users and therefore may require different types of user consents. Again by way of example, and not limitation, a health care provider may implement a billing campaign in which it sends invoices to those patients that have provided their consents to receive such billing information and/or remit payments using certain electronic funds transfers. Even if a patient consented to receiving billing information and making electronic payments, the billing campaign may require the user's additional consent to communicate over a particular channel or medium, such as over telephone or text messaging.

In this example, the health care provider may implement separate campaigns for communicating ePHI and marketing information to its patients, for example, using text messages. Different groups of patients may be subject to each of the health care provider's campaigns, depending on the user consents they have provided. In some cases, the same user may participate in multiple campaigns. More generally, those skilled in the art will appreciate the one or more campaigns described in accordance with the disclosed embodiments are not limited to any particular types of organizations, consents, or users, and may be tailored based on any desired consent-management implementation(s).

According to certain disclosed embodiments, each of the first, second, and third consent values may be represented graphically to allow an operator (such as an administrator) of the consent management system to easily identify the statuses of users' consents. In some embodiments, for example, the first, second, and third consent values for each user consent may be respectively depicted as yellow, green, and red icons, analogous to a traffic light. Accordingly, a yellow icon assigned to a user consent may indicate that its associated user may be contacted to request consent because the user has not previously granted or denied the user consent, whereas the green and red icons respectively indicate the user's previously communicated grant or denial of the consent.

In some disclosed embodiments, the consent management systems and methods allow a user to provide consent to allow communications of the user's information to certain "connected parties." For example, the consent management system may associate a child with one or more of the child's parents or siblings, who may be defined as the child's "connected parties" for purposes of the consent management system. Each connected party may comprise one or more individual users. In the example above, the child's connected parties may include individual family members, health care providers, acquaintances, etc., and/or groups of loved ones, teams of doctors, or other user groups. The child may provide consent to a third party, such as a health care provider, to share or communicate certain of the child's health, financial, and/or other information to its connected parties. The connected parties, moreover, also may need to separately provide their user consent(s) as necessary to effectuate the communications in compliance with one or more laws, rules, or regulations. In accordance with certain disclosed embodiments, a user may be associated with multiple connected parties within the consent management system. In some embodiments, each user may be assigned a unique User ID, and each user in a group of connected parties optionally may be assigned a common Group ID.

Advantageously, the consent management system in the disclosed embodiments may store, maintain, and update user-consent data for individual users comprising the status of their user consents, including any connected-party consents, and other related user information. The user-consent data may be used to implement automated consent management for one or more campaigns as described in the exemplary embodiments herein.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF DISCLOSED EMBODIMENTS

Figure 1:
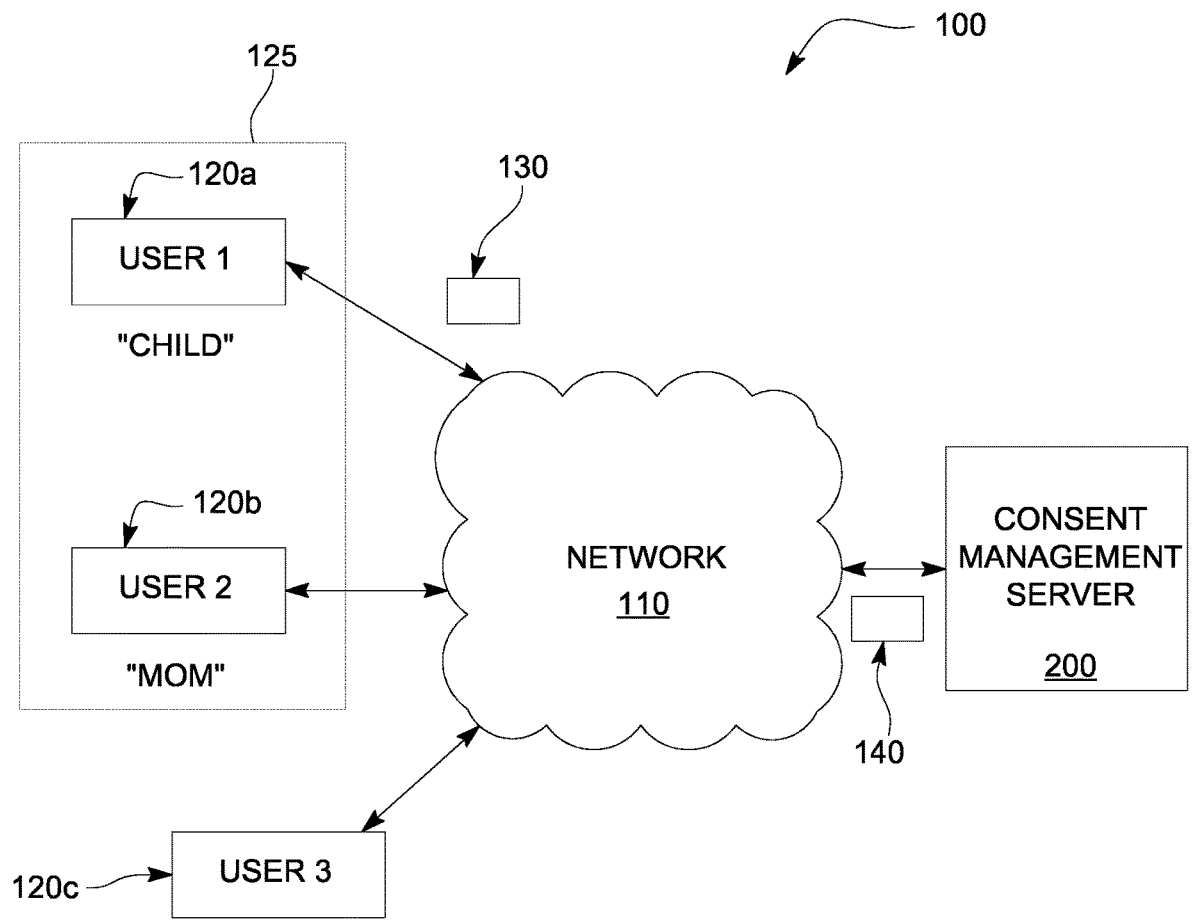
FIG. 1 is a schematic block diagram of an exemplary network comprising a consent management server and one or more users that may be used in accordance with certain disclosed embodiments.

FIG. 1 shows an exemplary network architecture 100 that may be used to implement automated consent management systems and methods in accordance with the disclosed embodiments of the invention. In this exemplary architecture, one or more users 120 may communicate with a consent management server 200 over a network 110. The consent management server 200 may be owned, operated, and/or controlled by an organization, such as but not limited to a health care provider, business, governmental agency, or any other entity that manages user consents. In some embodiments, the consent management server 200 may be a computer that is dedicated for managing user consents within an organization, or alternatively the server 200 may be implemented within one or more computers, some of which may be further configured to provide functionality in addition to consent management. In some embodiments, the server 200 may be implemented by one or more computers in a cloud-based network architecture, such that users 120 may access one or more cloud-based services provided by the consent management server.

Each user 120 may send and receive messages 130 that it exchanges with the consent management server 200 through the network 110. Similarly, the consent management server 200 may communicate messages 140 with one or more of the users 120 via the network 110. For example, the consent management server 200 may send a message 140 to a user 120 requesting that user's consent, for example, to communicate using text messages. In response, the user 120 may send a responsive message 130 either granting or denying the server's requested user consent. If the user grants the requested consent, the organization and user may subsequently exchange other types of messages 130 and 140 consistent with the consent that the user granted.

The network 110 may include wired and/or wireless connections. More generally, the network may comprise any configuration of interconnected computers and/or other devices for effectuating the exchange of messages 130 and 140 between the users 120 and the consent management server 200. The network 110 may comprise, for example, one or more public wide-area networks, such as the internet, and/or local area networks, such as proprietary enterprise networks, and may include one or more telecommunication networks, such as cellular networks and Public Switched Telephone Networks (PSTN). The network 110 may support packet-based and/or circuit-switched communications. Accordingly, it will be appreciated that network 110 is not intended to be limiting and that the scope of this disclosure includes implementations in which components of the exemplary architecture 100 may be operatively linked via various communication channels and/or media.

In some disclosed embodiments, a consent management system implemented at the consent management server 200 may allow a first user 120 to provide consent to allow that user's information to be communicated to certain other "connected parties." In FIG. 1, for example, the dotted circle around users 120*a* and 120*b* indicates that these users are connected parties 125. In some cases, the connected parties 125 may comprise family members, such as a child 120*a* and mother 120*b*. In such an example, the child 120*a* may provide its user consent to the consent management server 200 to allow the mother 120*b* to access the child's data that otherwise would be inaccessible according to one or more laws, rules, policies, or regulations.

As FIG. 1 shows, some users, such as user 120*c*, may not be a connected party 125 to other users. In this example, user 120*c* is not a connected party to child 120*a* and cannot access the child's health, financial, and/or other information that is only accessible to the child and the child's connected parties (with appropriate consents). In some embodiments, the child's connected party 120*b* may need to separately provide additional user consent(s) to the consent management server 200 as necessary to comply with all applicable consent requirements.

Figure 2:
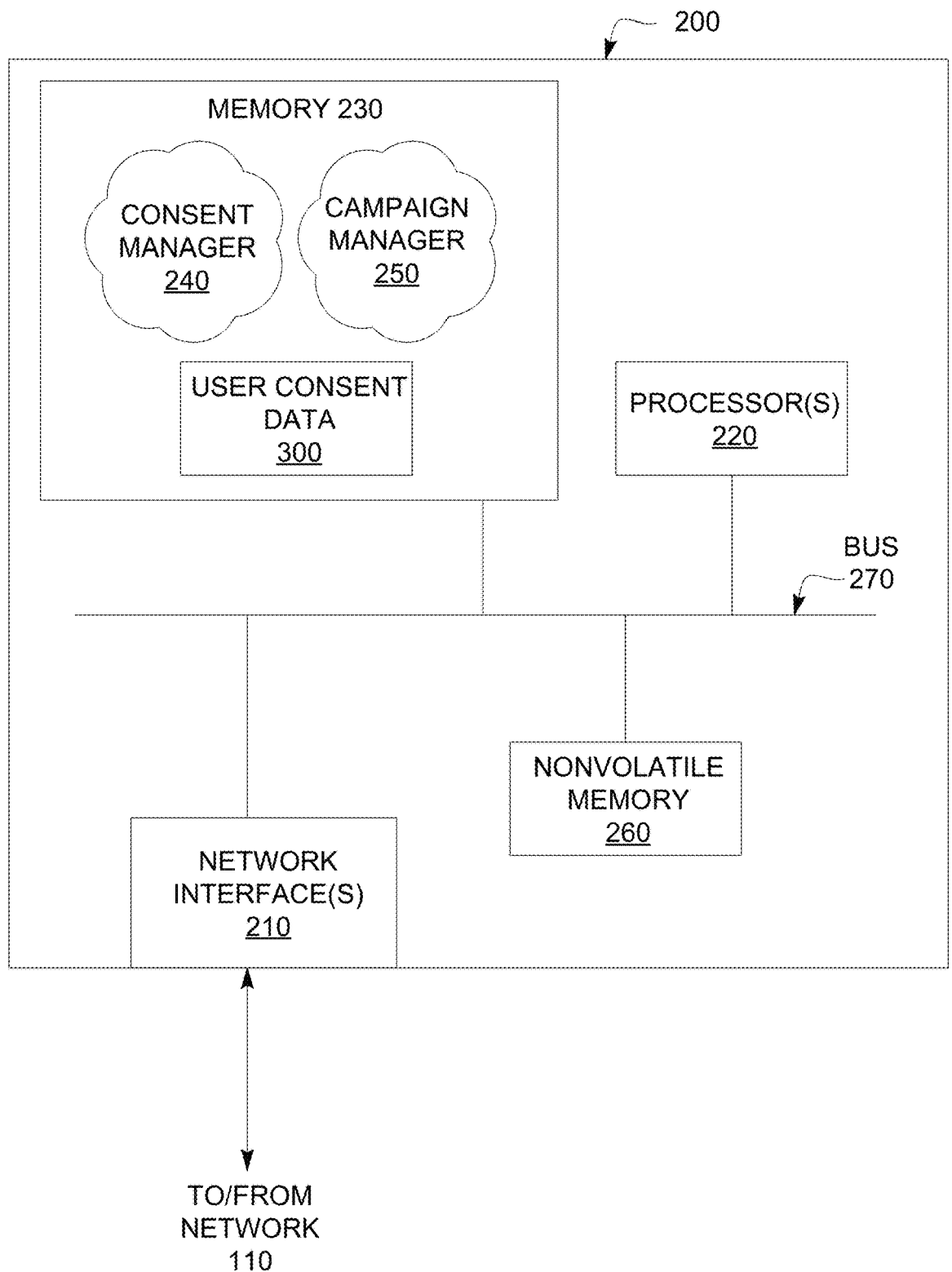
FIG. 2 is a schematic block diagram of the exemplary consent management server of FIG. 1 that may be used in accordance with certain disclosed embodiments.

FIG. 2 is a schematic block diagram of the exemplary consent management server 200 that may be used with one or more of the embodiments described herein. The exemplary server 200 may comprise one or more network interfaces 210 (e.g., wired, wireless, etc.), one or more processors 220, a memory 230, and a nonvolatile memory 260, interconnected by a system bus 270. The consent management server 200 also may contain other components, such as a power supply, memory controller(s), display/monitor, keyboard, mouse, printer, and so forth, which are not shown in FIG. 2 for purposes of clarity. Further, those skilled in the art will appreciate that the hardware and software components of consent management server 200 described below may be deployed in a single computer or alternatively may be distributed among multiple interconnected computers.

The network interface(s) 210 include the mechanical, electrical, and signaling circuitry for communicating data, such as but not limited to messages 140, to and from the network 110. The network interfaces may be configured to transmit and/or receive data using a variety of different communication protocols and data formats, and may include any wireless or wired/physical connections configured to communicate over different types of networks.

The one or more physical processors 220 (also interchangeably referred to herein as processor(s) 220, processor 220, or processors 220 for convenience) may be configured to provide information processing capabilities in the exemplary consent management server 200. The processor(s) 220 may comprise one or more of a microprocessor, microcontroller, central processing unit, application specific integrated circuit, field programmable gate array, or any other circuit, state machine, and/or other mechanism configured to electrically process information in accordance with the disclosed embodiments herein.

The memory 230 comprises a plurality of storage locations that are addressable by the processor(s) 220 and/or the network interfaces 210 for storing software programs and data structures associated with the embodiments described herein. The processor(s) 220 may comprise hardware elements or hardware logic adapted to execute the software programs and manipulate the data structures in the memory 230. Software programs and data may be loaded into the memory 230 from the nonvolatile storage 260, which may be a hard drive, solid state drive, battery-backed random access memory, or any other form of persistent memory as known in the art. Similarly, software and/or data that has been modified in the memory 230 may be committed to longer term storage in the nonvolatile memory 260. Each of the memory 230 and nonvolatile memory 260 may comprise one or more interconnected memories.

The processor(s) 220 may be configured to execute one or more computer readable instructions stored in the memory 230 to provide functionality of at least a consent manager 240 and a campaign manager 250 in accordance with the disclosed embodiments. The consent manager 240 may be used to automate user-consent management; the campaign manager 250 may interact with the consent manager 240 to implement one or more campaigns as described further below. In some embodiments, the consent manager 240 and campaign manager 250 may be implemented as separate applications. In alternative embodiments, the consent manager 240 and campaign manager 250 may be integrated into a single, monolithic software program. Further, in embodiments where the server 200 is deployed in cloud-based network architectures, the consent manager 240 and campaign manager 250 may be implemented as one or more cloud-based services accessible to users 120 over a network, such as the internet. The consent manager 240 and campaign manager 250 may share at least some computer-program components, such as but not limited to dynamic linked libraries, stored in the memory 230.

In addition, the memory 230 also may contain other computer readable instructions (not shown in FIG. 2) that when executed by the processor(s) 220 provide, for example, an operating system, network protocol stack, and other software processes, services, and applications. The memory 230 also may store various data, such as the user-consent data 300, that may be accessed and/or updated by one or both of the consent manager 240 and campaign manager 250. In operation, modifications to the user-consent data 300 in the memory 230 may be committed to more persistent storage in the nonvolatile memory 260 by the processor(s) 220.

Figure 3:
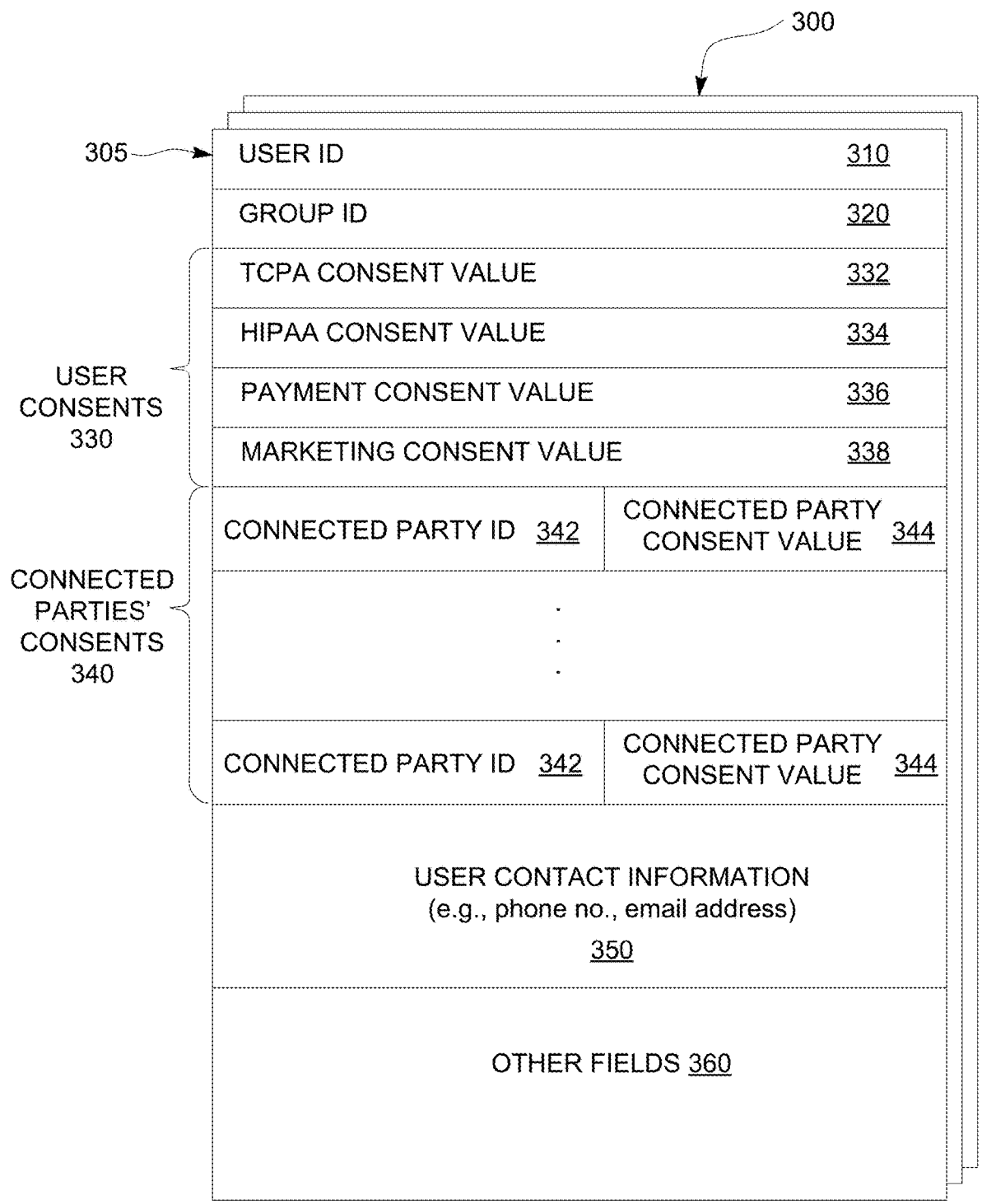
FIG. 3 is a schematic block diagram of user-consent data for one or more individual users that may be stored in the exemplary consent management server of FIG. 2 in accordance with certain disclosed embodiments.

FIG. 3 is a schematic block diagram of the user consent data 300 that may be used by the consent manager 240 and/or campaign manager 250 in accordance with certain disclosed embodiments. The user-consent data 300 preferably comprises separate files or records 305 (hereinafter user records 305) that store each user's consent information for the consent management system. The user consent data 300 may be stored, for example, as part of a database within the memory 230 and/or nonvolatile memory 260. In the exemplary embodiment of FIG. 3, each user record 305 comprises fields configured to store, for example, a User ID 310, Group ID 320, user consents 330, connected-party consents 340, user-contact information 350, and other fields 360. Those skilled in the art will understand that the ordering and arrangement of the exemplary fields in FIG. 3 are illustrative and other data formats may be used consistent with the disclosed embodiments.

The User ID 310 is a unique identifier value associated with a particular user 120. The consent manager 240 and/or campaign manager 250 preferably use the User ID value to index an associated user's data record 305. The Group ID 320 is preferably an optional field that stores a value used to associate one or more users 120 belonging to a common group. In certain embodiments, for example, the Group ID may be used to associate a group of connected parties. In such embodiments, the connected parties may be identified by filtering user-consent data records 305 based on Group ID values.

The user consents 330 comprise one or more user-consent values 332-338 corresponding to different types of user consents. For example, in the example of FIG. 3, the user record 305 includes a TCPA consent value 332, HIPAA consent value 334, payment consent value 336, and a marketing consent value 338. In this example, the TCPA consent value 332 may indicate whether the user has consented to text-message communications; HIPAA consent value 334 may indicate whether the user has consented to communications containing the user's ePHI; payment consent value 336 may indicate whether the user has consented to receiving electronic billing and/or payment; marketing consent value 338 may indicate whether the user has consented to receiving communications with marketing or targeting advertising content.

The specific user consent values 332-338 associated with each user may, in some embodiments, vary from user to user and/or depend on the particular consent-management implementation. For example, an organization that does not maintain ePHI for individual users may not need to obtain HIPAA consent values. Other organizations may only need to track GDPR consent values for its users. Thus, the specific consent values 330 illustrated in FIG. 3 are merely representative and not limiting.

In accordance with the disclosed embodiments, each user consent value may be associated with one of at least three possible values comprising: a first value indicating that the user has not yet responded with a grant or denial of consent; a second value indicating that the user has granted consent; and a third value indicating that the user has denied consent. In some embodiments, the third value also may indicate that the user has revoked a previously-granted consent. For example, each of the exemplary consent values 332-338 in FIG. 3 may be assigned one of the first, second, or third values. The consent manager 240, for example, may initially assign any, or all, of user-consent values 332-338 equal to the first value as a default value. Then, after the user indicates a grant or denial of a particular user consent, the consent manager may update the corresponding user-consent value 332-338 in the user's record 305 to either the second or third value, depending on whether the user granted or denied consent.

In contrast with prior consent-management systems and methods, the consent manager 240 may be configured to filter those user consents 332-338 in a user's record 305 that are assigned to the first value and automatically send, or cause another application or process to send, a message to the user requesting the user's consent(s). The consent manager, for example, may be configured to send a user a single message requesting one or more user consents for purposes of updating consent values in the user's record 305. In some embodiments, the consent manager 240 may be configured to sequentially scan each user record 305 to identify users having the first value assigned to a particular type of consent, such as TCPA consent value 332, and then send a separate user-consent request to each such identified user. In the disclosed embodiments, the consent manager 240 may scan and filter user-consent values 332-338 in the user records 305 periodically, at predetermined times, or asynchronously, such as at the start of a new campaign or upon occurrence of one or more predetermined events during a campaign.

The user record 305 may comprise one or more connected-party consents 340 indicating whether the user 120 associated with the user record 305 has provided consent for a connected party to access certain types of information. For example, the user record 305 may include one or more fields 342 that identify User ID values of the user's connected parties. Because each connected party may comprise one or more individual users 120, in some embodiments the connected-party ID field 342 may store a Group ID value or other identifier corresponding to a connected party consisting of a group of users. For example, a Group ID value stored in one of the fields 342 may correspond to a connected party composed of a group of loved ones, a team of doctors, a team within an organization, or any other group of users.

For each connected-party ID value 342 (e.g., User ID value, Group ID value, or other connected-party identifier), the user record 305 may further associate the connected party with one or more connected-party consent values 344 indicating whether the user associated with the record 305 has consented to allow that connected party to access certain types of information. Although not shown in FIG. 3, in some embodiments there may be multiple connected-party consent values 344 associated with each connected-party User ID value 342 or Group ID value 342. For example, there could be a separate HIPAA and payment consent values 344 associated with a single connected-party User ID value 342.

The user record 305 also may store various user-contact information 350 associated with the record's associated user 120. Such user-contact information 350 may include, for example, the user's phone number (e.g., for telephone or text-message communications), email address(es), mailing address(es), and/or other contact information. The record 305 also may contain one or more other fields 360, for example, storing various data including but not limited to, for example, the user record's date of creation, date of last update, identification and date of last sent user-consent request, identification and date of last completed campaign, etc.

According to certain disclosed embodiments, the first, second, and third consent values assigned to the user consents 330 may be represented graphically to allow an operator (such as an administrator) of the consent management server 200 to easily identify the statuses of users' consents. In some embodiments, for example, the first, second, and third consent values for each user consent 332-338 may be depicted as yellow, green, and red icons, analogous to a traffic light. Accordingly, a yellow icon assigned to a particular user consent may indicate that its associated user 120 may be contacted to request consent because the user has not previously granted or denied the consent, whereas a green icon indicates the user has already granted consent for the relevant communications and a red icon indicates that the user has previously denied consent and may not be contacted for the relevant communications. Other graphical representations are also possible, for example, using different colored flags or other indicia to signify each of the first, second, and third consent values.

Figure 4:
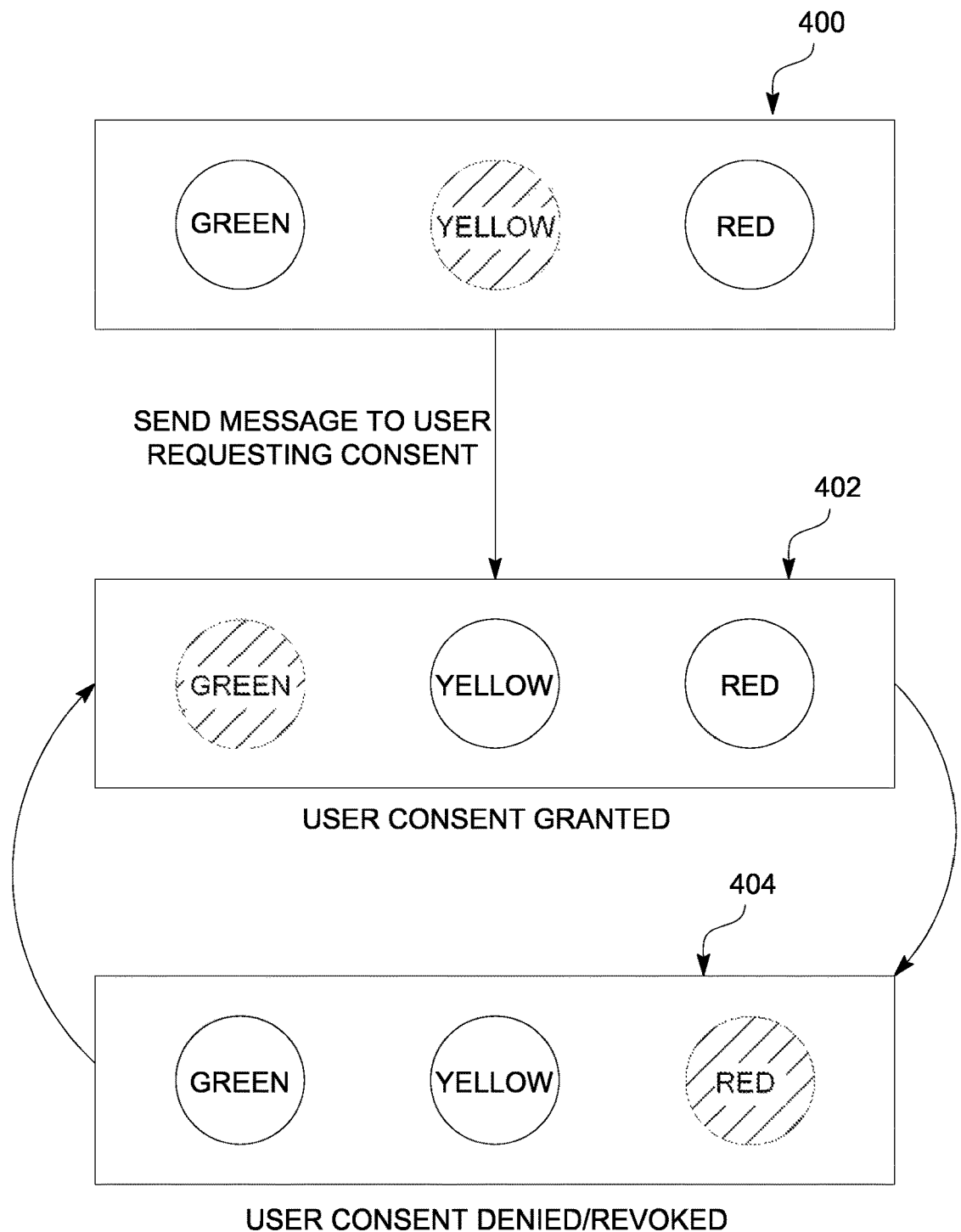
FIG. 4 is a schematic diagram illustrating exemplary graphical representations of various user consent values, and transitions between different user consent values, that may be employed by the consent management server in accordance with certain disclosed embodiments.

FIG. 4 illustrates exemplary graphical representations using green, yellow, and red icons to indicate the user-consent values 332-338 in accordance with certain disclosed embodiments. The graphical representations may be rendered or otherwise presented, for example, on a display of the consent management server 200, for a system administrator or other operator of the consent-management system to view. In a first state 400, a user consent value may be represented with a yellow icon to indicate that the user has not yet provided a grant or denial of the user consent. In this case, the consent manager 240 may be configured to detect the first consent value and send a message requesting the user's consent. If the user responds by granting the requested user consent, the user's record 305 may be updated and the modified consent value is graphically depicted using a green icon in a second state 402. Alternatively, if the user denies consent, then the modified consent value 404 is depicted with a red icon in a third state. If the user has granted consent, but then later revokes that user consent, the user consent value may transition from second state 402 to the third state 404. Conversely, the user consent value may transition from the third state 404 to the second state 402 if the user grants a user consent that it previously denied. The system administrator or other operator can more easily monitor the states 400, 402, or 404 of user consent values using their graphical representations without having to extract the specific values from the user consent data 300. Preferably, in embodiments using such graphical representations, the consent manager 240 and/or campaign manager 250 provides a graphical user interface for an administrator or other operator to view these graphical representations of user consent values.

Figure 5:
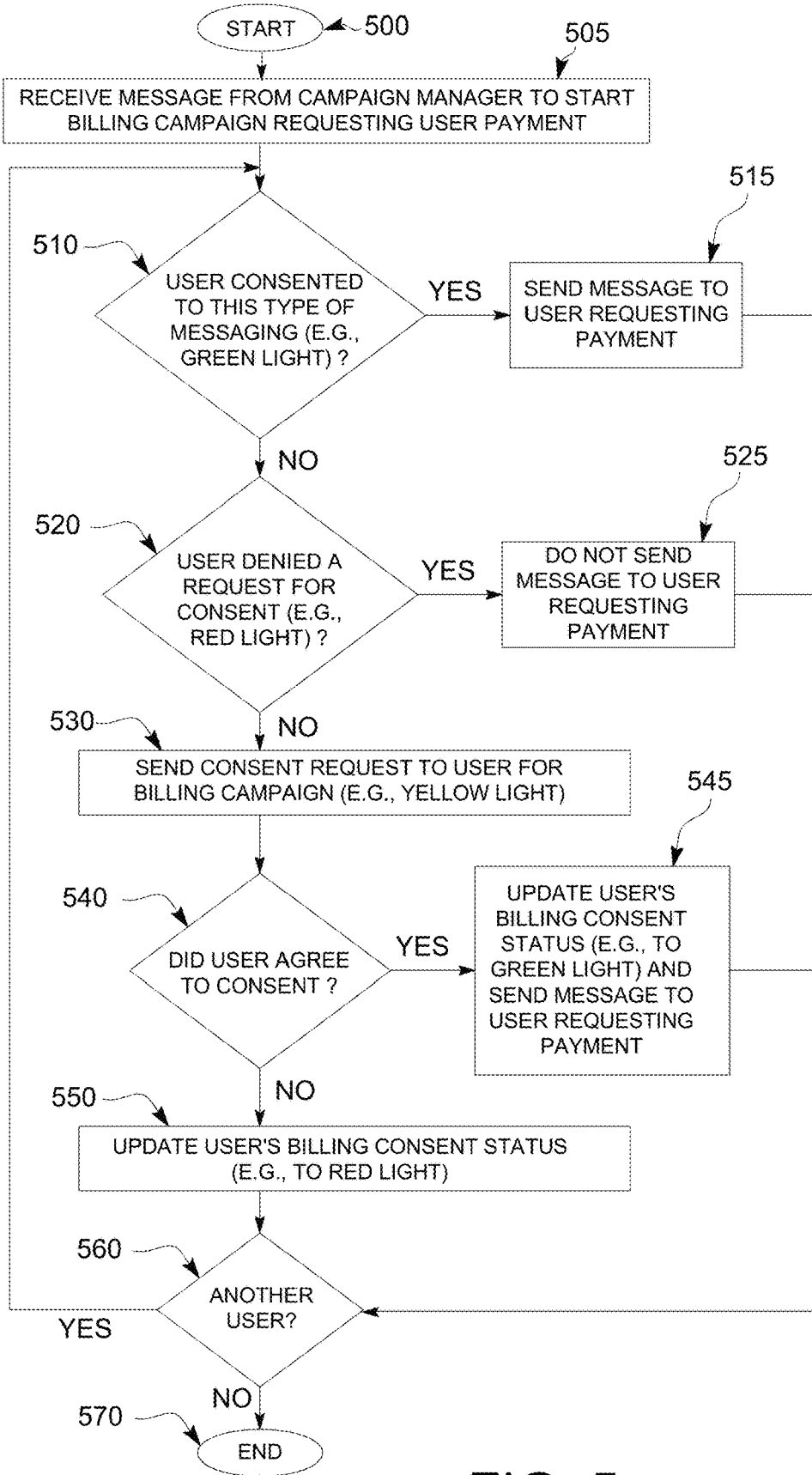
FIG. 5 is a flowchart illustrating an exemplary sequence of steps that may be performed at the campaign management server of FIG. 2 to implement an exemplary billing campaign for one or more users in accordance with certain disclosed embodiments.

FIG. 5 is a flowchart illustrating an exemplary sequence of steps that may be performed at the campaign management server 200 to implement an exemplary campaign in accordance with certain disclosed embodiments. The campaign manager 250 may be configured to initiate a campaign to contact one or more users 120 for a particular purpose, such as to send them billing information (e.g., including a summary or list of past-due invoices with payment links to make an electronic funds transfer), appointment reminders, or any other type of communication. The campaign manager may be configured to automate certain campaigns periodically or at predetermined times, such as at the beginning, middle, or end of each month. In some embodiments, the campaign manager 250 may be configured to start a campaign based on input from a system administrator or operator of the consent management server 200.

The campaign manager 250 may require one or more user consents 330 to comply with the requirements of applicable laws, rules, and/or regulations. For this reason, the campaign manager 250 may be configured to interact with the consent manager 240 to ensure that only those users that provided the relevant user consent(s) are contacted during the campaign.

For purposes of example and explanation, FIG. 5 illustrates a sequence of steps that the consent manager 240 may perform to implement an automated consent-management system according to certain disclosed embodiments. In this example, the campaign manager 250 starts a billing campaign for an organization in which users are required to provide their consent before receiving billing information from the organization. The exemplary steps in FIG. 5 may be used to provide an automated consent-management system for any type of campaign. The exemplary steps of FIG.

5 may be supplemented or repeated to ensure user-consent compliance when more than one type of user consent is required for a campaign.

The sequence starts at step 500 and proceeds to step 505 where the consent manager 240 receives a message from the campaign manager 250 to start a billing campaign requesting user payments of past due bills. The message from the campaign manager 250 to the consent manager 240 may be an interapplication communication or any other indication in which the campaign manager may notify the consent manager that a new campaign has begun.

After receiving the such a message from the campaign manager, the consent manager may analyze user records 305 for one or more users 120. For each user record, at step 510, the consent manager 240 may determine whether the user's payment consent value 336 indicates that the user has previously consented to receiving billing information, e.g., corresponding to a green-light icon. If the consent manager determines that the user previously provided the required user consent for receiving billing and payment information, then at step 515, the consent manager sends, or causes another process to send, a message to the user requesting payment. The consent manager may then determine, at step 560, whether there is another user record 305 to analyze for this billing campaign. If there is another user record to analyze, the sequence returns to step 510; otherwise it ends at step 570.

If, at step 510, the consent manager 240 determines that the user has not previously granted consent for receiving billing information, then the sequence instead advances to step 520 where the consent manager determines if the user's payment consent value 336 indicates that the user has previously denied its consent to receive billing information, e.g., corresponding to a red-light icon. If so, the consent manager does not send a billing and payment message to the user, thereby complying with the user's denial of the required consent, and the sequence proceeds to step 560 to determine if there is another user record 305 to analyze for the billing campaign. If there is another user record to analyze for the campaign, then the sequence returns to step 510; otherwise it ends at step 570.

If the consent manager 240 determines at steps 510 and 520 that the user has not yet granted or denied its consent to receive billing information, e.g., corresponding to a yellow-light icon, then at step 530 the consent manager may send, or cause another process to send, a message to the user requesting the necessary user consent to communicate billing and payment information. The consent manager determines, at step 540, if the user has sent a response message granting or denying the requested user consent. If it is determined that the user has granted its consent, then at step 545 the consent manager may update the payment consent value 336 in the user's record to indicate that consent has been granted (e.g., corresponding to a green-light icon) and then the consent manager may send, or cause to be sent, a message to the user with the user's billing and payment information. Next, at step 560 the consent manager determines if there is another user record 305 to analyze and, if so, the sequence returns to step 510; otherwise it ends at step 570.

At step 550, if it is determined that the user responded to the consent request (from step 530) by denying the requested user consent, the consent manager may update the payment consent value 336 in the user's record to indicate that consent has been denied (e.g., corresponding to a red-light icon) and the user's billing and payment message is not sent to the user. The sequence then advances to step 560 where the consent manager determines if there are additional user records 305 to analyze for the campaign and, if so, returns to step 510; otherwise the sequence ends at step 570.

In alternative embodiments, the consent manager 240 or campaign manager 250 may be configured to initially filter all of the user records 305 to identify users having payment consent values 336 indicating that they have not yet granted or denied their consent (e.g., corresponding to a yellow-light icon). In such alternative embodiments, a blast email or similar broadcast or multicast message may be sent to all of the identified users to request their consent for receiving billing information before commencing the exemplary sequence of steps in FIG. 5.

In yet other exemplary embodiments, the consent manager may be configured not to send a message to a user at steps 515 or 545 until steps 510-550 have been performed for multiple different types of user consents. For example, steps 510-550 may be performed to confirm that each user has provided an affirmative TCPA consent value 332 and then repeated to confirm that each user has also provided an affirmative payment consent value 336 before the consent manager will allow messages containing billing and payment information to be sent to the user at step 515 or 545. Similarly, for other types of campaigns, steps 510-550 may need to be repeated to check several required user consents before the consent manager determines that it can send a message to a user at steps 515 or 545.

Further, in some embodiments, steps 510-550 may need to be repeated to determine if the user has granted any connected-party consents before the consent manager may send, or cause to be sent, a message containing the user's billing and payment information to any connected party of the user at steps 515 or 545. In such embodiments, the connected party's record 305 also may need to be checked to confirm that the connected party has provided all of the necessary user consents for it to receive billing and payment information in order to comply with all relevant user-consent requirements during the campaign.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions that may be executed on a computer, hardware, firmware, or a combination thereof. It also will be apparent to those skilled in the art that other processor and memory types, including various computer-readable media, may be used to store and execute program instructions pertaining to the techniques described herein. Further, the invention is not limited to any particular hardware platform or set of software capabilities.

While the disclosed embodiments illustrate various processes, it is expressly contemplated that various processes may be embodied as modules configured to operate in accordance with the techniques herein (e.g., according to the functionality of a similar process). Further, while certain processes have been shown or described separately, those skilled in the art will appreciate that the disclosed processes may be routines or modules within other processes. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for providing automated management of user consents when one or more user consents are required for a consent management system to communicate with a plurality of users over a network, the method comprising:

(a) initiating a first campaign to send messages comprising a first type of content to a first set of one or more users;

(b) accessing a first user record associated with a first user from a set of user records stored in a physical memory, each user in the first set of one or more users limited to a single user record in the set of user records, and each user record in the set of user records comprising one or more user consent values for a user associated with the user record, wherein the same set of user records in the physical memory is configured to store user consent values for use during each of the first campaign and a second campaign, wherein each user consent value is assigned one of a first value indicating that the user has not granted or denied consent, a second value indicating that the user has granted consent, or a third value indicating that the user has denied consent, and wherein the first user record comprises a first user identifier corresponding to the first user, a second user identifier corresponding to a connected party to the first user, and a first connected-party consent value for the connected party, and wherein the second user identifier in the first user record is configured to identify a second user record in the same set of user records containing the first user record in the same physical memory, the second user record comprising the second user identifier and further comprising a second connected-party consent value indicating if the connected party consents to receiving text messages from the consent management system;

(c) determining if the first value has been assigned to a first type of user consent in the accessed first user record;

(d) sending, in response to determining that the first value has been assigned to the first type of user consent, a first message from the consent management system over the network to the first user to request the first user's consent for the first type of user consent;

(e) receiving at the consent management system a response from the first user over the network, the response indicating that the first user either grants or denies consent for the first type of user consent;

(f) changing, based on the contents of the received response, the first value assigned to the first type of user consent in the accessed first user record to either (i) the second value if the received response indicates that the first user has granted consent or (ii) the third value if the received response indicates that the first user has denied consent;

(g) sending, from the consent management system to the first user over the network, a second message containing information corresponding to the first type of user consent if the user consent value for the first type of user consent in the accessed first user record is assigned to the second value;

(h) using the second user identifier stored in the first user record to locate the second user record also containing the second user identifier in the same set of user records stored in the physical memory;

(i) accessing from the set of user records in the physical memory, without requesting any new consent from the connected party over the network, the second connected-party consent value from the second user record;

(j) sending, from the consent management system to the connected party over the network, a text message comprising content from the second message if the first connected-party consent value is assigned to the second value and the second connected-party consent value is assigned to the second value, wherein each of the steps (b) through (i) are performed during the first campaign;

(k) initiating the second campaign to send messages comprising a second type of content to a second set of one or more users, wherein the messages comprising the second type of content are sent to the second set of one or more users during the second campaign for a different purpose than the messages comprising the first type of content sent to the first set of one or more users during the first campaign;

(l) accessing from the set of user records in the physical memory, during the second campaign, the same first user record associated with the first user that was previously accessed for the first user in connection with the first campaign;

(m) sending, from the consent management system to the first user over the network during the second campaign, a third message comprising the second type of content if a user consent value associated with a second type of user consent in the accessed first user record is assigned to the second value.

2. The method of claim 1, wherein one or more users in the first set of one or more users are also included in the second set of one or more users.

3. A method for providing automated management of user consents for a plurality of users that are configured to communicate with a computer system over a network, the method comprising:

(a) initiating a first campaign to send messages comprising a first type of content to a first set of one or more users;

(b) accessing, by the computer system, a first user record from a set of user records stored in a physical memory, each user in the first set of one or more users limited to a single user record in the set of user records, and the first user record being associated with a first user in the plurality of users, wherein the first user record comprises a first user identifier corresponding to the first user, a second user identifier corresponding to a connected party associated with the first user, and a first connected-party consent value associated with the connected party, wherein the second user identifier in the first user record is configured to identify a second user record in the same set of user records containing the first user record in the same physical memory, the second user record comprising the second user identifier and further comprising a second connected-party consent value indicating if the connected party consents to receiving text messages from the computer system, and wherein the same-set of user records in the physical memory is configured to store user consent values for use during each of the first campaign and a second campaign;

(c) sending, from the computer system to the first user over the network, a first message comprising the first type of content if a user consent value in the accessed first user record is assigned a value indicating that the first user granted a consent for the computer system to communicate the first type of content to the first user;

(d) using the second user identifier stored in the first user record to locate the second user record also containing the second user identifier in the same set of user records stored in the physical memory;

(e) accessing, by the computer system, the second user record from the set of user records stored in the physical memory, the second user record being associated with the same connected party corresponding to the second user identifier stored in the first user record;

(f) sending, without requesting any new consent from the connected party over the network, a text message from the computer system over the network to the connected party if:
  (i) the first connected-party consent value in the accessed first user record is assigned a value indicating that the first user granted consent for the computer system to communicate with the connected party; and
  (ii) the second connected-party consent value in the accessed second user record is assigned a value indicating that the connected party granted a consent to receive text messages from the computer system, wherein each of the steps (b) through (ef) are performed during the first campaign;

(g) initiating the second campaign to send messages comprising a second type of content to a second set of one or more users, wherein the messages comprising the second type of content are sent to the second set of one or more users during the second campaign for a different purpose than the messages comprising the first type of content sent to the first set of one or more users during the first campaign;

(h) accessing, during the second campaign, from the set of user records stored in the physical memory, the same first user record associated with the first user that was previously accessed from the set of user records in the physical memory for the first user in connection with the first campaign; and (i) sending, from the computer system to the first user over the network during the second campaign, a second message comprising the second type of content if a user consent value in the accessed first user record is assigned a value indicating that the first user granted a consent for the computer system to communicate the second type of content to the first user.

4. The method of claim 3, wherein the second connected-party consent value in the accessed second user record corresponds to a user consent required to comply with the Telephone Consumer Protection Act (TCPA).

5. The method of claim 3, wherein the text message is a SMS message.

6. The method of claim 3, wherein the text message contains personal health information of the first user.

7. The method of claim 3, wherein the computer system is configured to provide user consent management at a health care provider.

8. The method of claim 3, further comprising sending information in the text message from the computer system over the network to the first user if the first user record comprises a user consent value indicating that the first user granted a type of consent associated with the contents of the text message.

9. The method of claim 3, further comprising sending a third message from the computer system over the network to the first user in order to request the first user's consent for a type of consent associated with the contents of the text message.

10. The method of claim 3, further comprising sending a third message from the computer system over the network to the first user in order to request the first user's consent for the computer system to communicate with the connected party.

11. The method of claim 3, further comprising sending the text message from the computer system over the network to the connected party if the second user record further includes a third connected-party consent value indicating that the connected party has provided a type of consent associated with the contents of the text message.

12. The method of claim 3, wherein the method is performed by a consent management system.

13. The method of claim 3, wherein one or more users in the first set of one or more users are also included in the second set of one or more users.

14. A consent management system for providing automated management of user consents when one or more user consents are required for the consent management system to communicate with a plurality of users over a network, the system comprising:
  one or more physical processors;
  one or more network interfaces configured to send messages to the plurality of users and receive messages from the plurality of users over the network; and
  a memory configured to store a set of user records for the plurality of users and computer program instructions that, when executed by the one or more physical processors, configure the consent management system to:
  (a) initiate a first campaign to send messages comprising a first type of content to a first set of one or more users;
  (b) access a first user record from a set of user records stored in the memory, each user in the first set of one or more users limited to a single user record in the set of user records, and the first user record being associated with a first user in the plurality of users, wherein the first user record comprises a first user identifier corresponding to the first user, a second user identifier corresponding to a connected party associated with the first user, and a first connected-party consent value associated with the connected party, wherein the second user identifier in the first user record is configured to identify a second user record in the same set of user records containing the first user record in the memory, the second user record comprising the second user identifier and further comprising a second connected-party consent value indicating if the connected party consents to receiving text messages from the consent management system, and wherein the set of user records in the memory is configured to store user consent values for use during each of the first campaign and a second campaign;
  (c) send, from the consent management system to the first user over the network, a first message comprising the first type of content if a user consent value in the accessed first user record is assigned a value indicating that the first user granted a consent for the consent management system to communicate the first type of content to the first user;
  (d) use the second user identifier stored in the first user record to locate the second user record also containing the second user identifier in the same set of user records stored in the memory;
  (e) access the second user record from the set of user records stored in the memory, the second user record being associated with the same connected party corresponding to the second user identifier stored in the first user record;

(f) send, without requesting any new consent from the connected party over the network, a text message from the consent management system to the connected party over the one or more network interfaces if:

(i) the first connected-party consent value in the accessed first user record is assigned a value indicating that the first user granted consent for the computer system to communicate with the connected party; and (ii) the second connected-party consent value in the accessed second user record is assigned a value indicating that the connected party granted a consent to receive text messages from the consent management system, wherein each of the steps (b) through (f) are performed during the first campaign;

(g) initiate the second campaign to send messages comprising a second type of content to a second set of one or more users, wherein the messages comprising the second type of content are sent to the second set of one or more users during the second campaign for a different purpose than the messages comprising the first type of content sent to the first set of one or more users during the first campaign;

(h) access, during the second campaign, from the set of user records stored in the memory, the same first user record associated with the first user that was previously accessed from the set of user records in the memory for the first user in connection with the first campaign; and (i) send, from the consent management system to the first user over the network during the second campaign, a second message comprising the second type of content if a user consent value in the accessed first user record is assigned a value indicating that the first user granted a consent for the consent management system to communicate the second type of content to the first user.

15. The consent management system of claim 14, wherein the second connected-party consent value in the accessed second user record corresponds to a user consent required to comply with the Telephone Consumer Protection Act (TCPA).

16. The consent management system of claim 14, wherein the text message is a SMS message.

17. The consent management system of claim 14, wherein the text message contains personal health information of the first user.

18. The consent management system of claim 14, wherein the consent management system is configured to provide user consent management at a health care provider.

19. The consent management system of claim 14, wherein the computer program instructions, when executed by the one or more physical processors, further configure the consent management system to send information in the text message over the one or more network interfaces to the first user if the first user record comprises a user consent value indicating that the first user granted a type of consent associated with the contents of the text message.

20. The consent management system of claim 14, wherein the computer program instructions, when executed by the one or more physical processors, further configure the consent management system to send a third message to the first user over the one or more network interfaces in order to request the first user's consent for a type of consent associated with the contents of the text message.

21. The consent management system of claim 14, wherein the computer program instructions, when executed by the one or more physical processors, further configure the consent management system to send a third message to the first user over the one or more network interfaces in order to request the first user's consent for the consent management system to communicate with the connected party.

22. The consent management system of claim 14, wherein the computer program instructions, when executed by the one or more physical processors, further configure the consent management system to send the text message to the connected party over the one or more network interfaces if the second user record further includes a third connected-party consent value indicating that the connected party has provided a type of consent associated with the contents of the text message.

23. The consent management system of claim 14, wherein one or more users in the first set of one or more users are also included in the second set of one or more users.

* * * * *

UNITED STATES PATENT AND TRADEMARK OFFICE
CERTIFICATE OF CORRECTION

PATENT NO. : 12,265,973 B2
APPLICATION NO. : 18/099026
DATED : April 1, 2025
INVENTOR(S) : Keith Dressler et al.

It is certified that error appears in the above-identified patent and that said Letters Patent is hereby corrected as shown below:

In the Claims

Claim 3, Column 15, Line 23: "wherein each of the steps (b) through (ef) are performed" should read --wherein each of the steps (b) through (f) are performed--

Signed and Sealed this
Thirteenth Day of May, 2025

Coke Morgan Stewart
*Acting Director of the United States Patent and Trademark Office*